United States Patent
King et al.

(10) Patent No.: US 6,445,927 B1
(45) Date of Patent: Sep. 3, 2002

(54) METHOD AND APPARATUS FOR CALIBRATING BASE STATION LOCATIONS AND PERCEIVED TIME BIAS OFFSETS IN AN ASSISTED GPS TRANSCEIVER

(75) Inventors: Thomas M. King, Tempe; George J. Geier, Scottsdale, both of AZ (US); Gerald J. Gutowski, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/666,498

(22) Filed: Sep. 18, 2000

(51) Int. Cl.$^7$ .................................................. H04Q 7/20

(52) U.S. Cl. .................................. 455/456; 342/357.06

(58) Field of Search .................. 342/357.06, 357.01, 342/357.08, 357.1, 357.13; 455/456, 457; 701/214, 213

(56) References Cited

U.S. PATENT DOCUMENTS

| | | | |
|---|---|---|---|
| 4,445,118 A | 4/1984 | Taylor et al. | |
| 5,365,450 A | 11/1994 | Schuchman et al. | |
| 5,986,603 A | * 11/1999 | Schipper | ..................... 342/357 |
| 6,252,543 B1 | * 6/2001 | Camp | .......................... 455/456 |

\* cited by examiner

Primary Examiner—Nguyen T. Vo
(74) Attorney, Agent, or Firm—Sylvia Y. Chen; Randall S. Vaas

(57) ABSTRACT

A flowchart (400) includes the step (402) of collecting a predetermined number of TOA measurements arriving at the assisted satellite positioning mobile station from a base station, the step of (406) simultaneously collecting a corresponding number of GPS position measurements of a position of the GPS receiver, and the step (410) of computing the base station location and/or the step (414) of computing a perceived time bias offset required for a message to travel between the base station and the mobile station using the predetermined number of TOA measurements and the predetermined number of GPS position measurements.

23 Claims, 3 Drawing Sheets

-PRIOR ART-

METHOD AND APPARATUS FOR CALIBRATING BASE STATION LOCATIONS AND PERCEIVED TIME BIAS OFFSETS IN AN ASSISTED GPS TRANSCEIVER

BACKGROUND OF THE INVENTION

1. Field of the Invention

The present invention relates generally to a satellite positioning receiver, and more particularly to a Global Positioning System (GPS) receiver in an assisted GPS handset operating in conjunction with one or more cellular base stations (BSs).

2. Description of the Background Art

The Global Positioning System (GPS) is a satellite-based positioning system developed by the U.S. Department of Defense to give accurate positional information to a GPS receiver anywhere in the world. A properly equipped GPS receiver may therefore be used in any setting in which a positional fix is desired, and typically yields positional coordinates in three dimensions.

GPS is enabled by a satellite orbital constellation made up of twenty-four or more satellites orbiting the earth in twelve-hour orbits. The satellites are arranged in six orbital planes, each containing four satellites. The orbital planes are spaced sixty degrees apart and are inclined approximately fifty-five degrees from the equatorial plane. This constellation ensures that from four to twelve satellites will be visible at any time at any point on earth with a clear view of the sky.

A three-dimensional position fix may be determined if signals are being received from four or more GPS satellites. The received satellite signals each contain an identifier unique to that particular satellite. These identifier codes are commonly called Gold codes or pseudorandom noise (PRN) codes and allow a GPS receiver to discriminate between signals from different satellites. Also contained within the signals are satellite ephemeris data containing information such as an orbital configuration and a satellite time. (All GPS satellite signals contain a common, synchronized GPS time.) This satellite time signal allows a GPS receiver to detect a time of receipt and therefore measure a transit time of the signal. In turn, the transit time enables a GPS receiver to determine a distance (termed a pseudorange) to the satellite. Four GPS pseudoranges allow a location on the Earth's surface to be determined.

There are many uses for portable, hand-held GPS receivers including use in an assisted GPS handset. Because of processing time constraints and incomplete satellite coverage, handset-based GPS receivers may operate in conjunction with one or more BSs. As described in related art, the base station (BS) can be employed to relieve GPS receivers from certain processing duties, improve the accuracy of the resulting location solution, and improve fix coverage in areas that are marginal for GPS signal tracking (e.g., in an urban canyon or indoors). The serving BS (i.e., the BS that is responsible for maintaining communication with the handset) can provide the mobile handset with satellite Doppler information (U.S. Pat. No. 4,445,118 to Taylor, et al.) and/or satellite ephemeris data (U.S. Pat. No. 5,365,450 to Schuchman, et al.) to reduce the time required to acquire the GPS signals and derive a location fix within the handset. In addition, differential corrections can be broadcast to GPS receivers in handsets. These corrections, if received with minimum latency, can remove most of the error associated with each pseudorange measurement. Finally, additional range measurements can be derived from the arrival times associated with the transmissions of pilot signals from each BS, which can be used to augment the GPS-only solution and provide position fixes in situations where GPS cannot. One type of information that is commonly relayed in the related art is locations of nearby BSs. BS locations may be useful to the mobile GPS receivers to give a starting position for a positional fix and may reduce the signal search space and therefore reduce the acquisition time for the GPS signals. A second type of information that is commonly relayed is a time bias offset associated with each nearby BS. This offset is a bias between the time maintained by the BS and GPS time.

FIG. 1 shows a related art mobile GPS receiver in a cellular handset operating in conjunction with a single BS. Each related art cellular handset receives a transmission from the BS containing the BS position embedded therein along with a time bias offset b. The BS position may be expressed in Cartesian coordinates as $x_{BS}$, $y_{BS}$. A drawback of the related art approach is that related art handset-based GPS receivers cannot make use of TOA measurements from the network infrastructure and calculate a positional fix based solely on TOA measurements until the required data ($x_{BS}$, $y_{BS}$, b) is received from the BS.

What is needed, therefore, is a method for determining BS locations and time bias offsets in a handset-based GPS receiver without necessarily having to receive the BS locations and time bias offsets from the infrastructure.

DETAILED DESCRIPTION OF THE PREFERRED EMBODIMENTS

Figure 1:
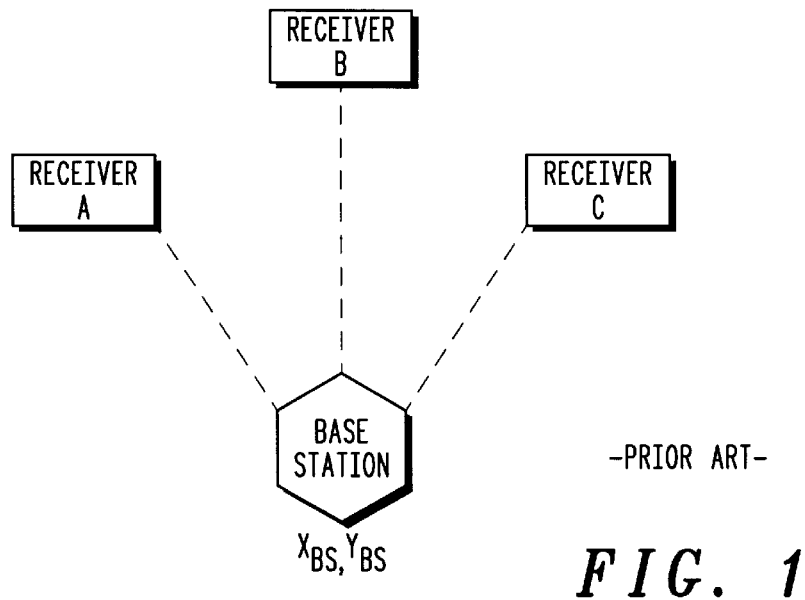
FIG. 1 shows related art mobile GPS receivers operating in conjunction with a base station.

A method for calibrating a base station (BS) location and/or perceived time bias offset in a mobile station (MS) with a satellite positioning receiver, such as a GPS receiver, is provided according to a first embodiment. The method includes the steps of collecting a number of TOA measurements arriving at the MS from a BS, simultaneously collecting a corresponding number of GPS position measurements of a position of the GPS receiver, and computing the BS location and/or perceived time bias offset using the collected TOA and GPS position measurements.

A method for calibrating a BS location and/or perceived time bias offset in an MS with a satellite positioning receiver, such as a GPS receiver, is provided according to a second embodiment. The method includes the steps of collecting at least three TOA measurements $TOA_1$, $TOA_2$ and $TOA_3$ arriving at the MS from a BS, wherein a TOA measurement is capable of being expressed as $TOA_r = b' + \sqrt{[(x-x_t)^2 + (y-y_t)^2]}$, with variable $b'$ being a perceived time bias offset as seen by the MS and $(x, y)$ being unknown BS coordinates. The method simultaneously collects at least three GPS position measurements of a position of the GPS receiver, wherein a position measurement is denoted as $x_t$ and $y_t$ as a function of time. The method then subtracts a first TOA measurement from two subsequent TOA measurements to create two TOA measurement differences $TOA_{31}$ and $TOA_{21}$ and substitutes a distance variable $d_1$ for the unknown BS coordinates x, y in the two TOA measurement differences $TOA_{31}$ and $TOA_{21}$ to produce a quadratic equation for the distance variable $d_1$, where the distance variable is given by $d_1=\sqrt{[(x-x_t)^2+(y-y_t)^2]}$. The method then solves the quadratic equation for the distance variable $d_1$ to obtain an estimated range $d_e$, solves for the unknown BS coordinates x, y using the estimated range $d_e$, and obtains the perceived time bias offset b' by subtracting the estimated range $d_e$ from $TOA_1$, $TOA_2$, or $TOA_3$.

An apparatus for calibrating a BS location is provided according to a third embodiment. The apparatus includes an MS with a satellite positioning receiver, a TOA measurement storage capable of storing a plurality of TOA measurements, a GPS receiver position fix storage capable of storing a plurality of position fixes, a BS coordinates solution storage, a time bias offset storage, and a processor. The processor communicates with the satellite positioning receiver to receive signals from positioning satellites and the BS and further communicates with the TOA measurement storage, the satellite positioning receiver position fix storage, the BS coordinates solution storage, and the time bias offset storage. The processor is capable of collecting and storing TOA measurements, collecting and storing a corresponding number of satellite position measurements, subtracting a first TOA measurement from subsequent TOA measurements to create TOA differences, substituting a distance variable $d_1$ for the unknown BS coordinates x, y in the TOA differences to produce a quadratic equation, solving the quadratic equation for the distance variable $d_1$ to obtain an estimated range $d_e$, solving for the unknown BS coordinates x, y, obtaining the perceived time bias offset by subtracting the estimated range $d_e$ from the TOA measurements, linearizing TOA equations to produce linearized TOA equations, generating a vector of measurement residuals $TOA_{res}$, computing a weighted least squares solution $x_{sol}$ of the TOA equations, using the weighted least squares solution $x_{sol}$ to assess an accuracy of the linearized TOA equations, and stopping the linearizing when solution error variances of the weighted least squares solution $x_{sol}$ become less than a solution error variance threshold.

Once the BS calibration is essentially complete, the perceived time bias offset b' as seen by the MS is periodically re-determined and associated with each MS location or BS service area. Over time, this association permits construction of a temporal map, or database, of perceived time bias offsets versus position over the area served by a BS. The perceived time bias offset b' represents the time bias offset b as affected by spatial error from multipath in addition to the fixed error induced by cable delays, internal BS harnessing, software processing, clock source distribution, and other factors. This map can be derived and maintained for many BSs by the cellular infrastructure and broadcast to other MSs (whether or not GPS-equipped) to improve their location accuracy.

Figure 2:
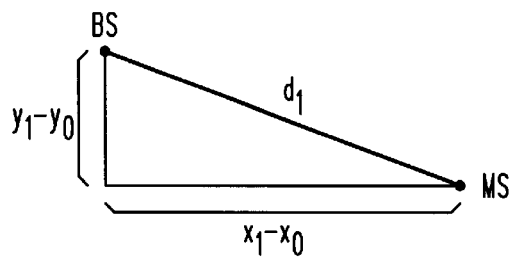
FIG. 2 illustrates a distance determination utilizing Cartesian coordinates.

FIG. 2 illustrates a distance determination utilizing Cartesian coordinates. Although Cartesian coordinates are used here, other coordinates (e.g. polar) can be used to determine distance. In the figure, the distance $d_1$ from the MS to the BS can be determined by the formula $d_1=\sqrt{[(x_1-x_0)^2+(y_1-y_0)^2]}$. This formula assumes that the earth is locally flat over the distance between the BS and MS, an excellent approximation over the range of distances expected (i.e., less than twenty km). An MS as used herein can be a cellular handset, a vehicle-based communication transceiver, or any other type of mobile radio transceiver.

Figure 3:
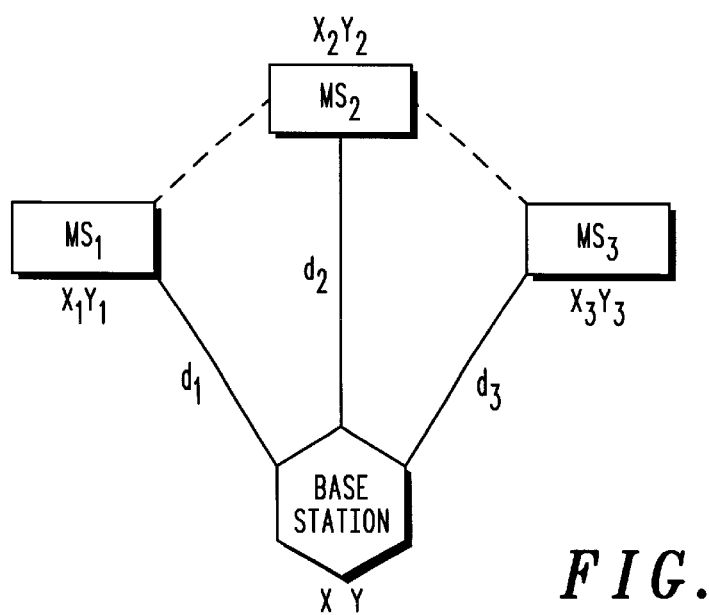
FIG. 3 shows a typical mobile station to base station geometry illustrating that the mobile station is moving relative to the base station.

FIG. 3 shows a typical MS to BS geometry having an MS with a satellite positioning receiver that is moving relative to the BS. Because of the movement of the MS, it is at position $MS_1$ at time t=1, at position $MS_2$ at time t=2, at position $MS_3$ at time t=3, etc. Therefore, the distance to the BS may change, as shown by distances $d_1$, $d_2$, and $d_3$.

Figure 4:
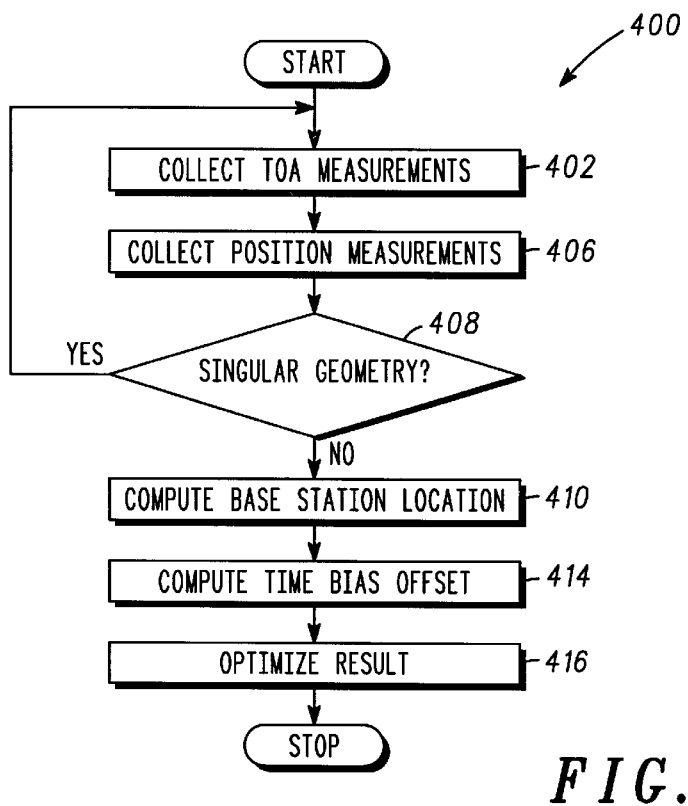
FIG. 4 shows a flowchart of a first embodiment of a method for calibrating base station locations and time bias offsets.

FIG. 4 shows a flowchart 400 of a first embodiment of a method for calibrating BS locations and perceived time bias offsets. In step 402, MS TOA measurements are collected. The derivation of the BS coordinates x, y and the perceived time bias offset b' may be done through use of at least three received TOA measurements from the BS.

In use, the MS may receive multiple TOA measurements from the BS. A first derived TOA measurement is:

$$TOA_1 = b' + \sqrt{[(x-x_1)^2 + (y-y_1)^2]} \tag{1}$$

where $TOA_1$ is a TOA measurement derived by the BS at a time t=1, where $x_t$ and $y_t$ are the known GPS position fix coordinates of a mobile GPS receiver at a time t (i.e., $x_1$ and $y_1$ are $x_t$ and $y_t$ at the time t=1), where b' is the unknown perceived time bias offset of the BS, and where (x, y) are the unknown BS coordinates. Equation (1) therefore represents a single equation having three unknowns.

Equation (1) is linear in the perceived time bias offset b' variable, but nonlinear in the BS coordinates x, y. Note that the TOA measurement $TOA_t$ and the mobile GPS receiver coordinates $x_t$, $y_t$ are time variant.

At a later time t=2, denoted by the subscript 2, a second TOA measurement is derived from the BS:

$$TOA_2 = b' + \sqrt{[(x-x_2)^2 + (y-y_2)^2]} \tag{2}$$

Consideration of equations (1) and (2) provides two equations with three unknowns. Derivation of a third TOA is required to generate estimates of x, y, and b'. At yet a later time t=3, denoted by the subscript 3, a third TOA measurement is derived from the BS:

$$TOA_3 = b' + \sqrt{[(x-x_3)^2 + (y-y_3)^2]} \tag{3}$$

Note that a single perceived time bias offset term b' is used in equations (1)–(3). The change in b' due to movement of the GPS receiver is assumed sufficiently small so that b' can be assumed a constant. Once the BS location has been accurately determined and verified, this assumption can be relaxed, and the perceived time bias offset b' can be determined periodically.

In step 406, a corresponding number of GPS receiver position measurements are generated by the GPS receiver. These take the form of $x_t$ and $y_t$, where t is the time of measurement. Therefore, as the GPS receiver moves, it generates distinct positional fixes $(x_1,y_1)$, $(x_2,y_2)$, and $(x_3, y_3)$, as shown in FIG. 3 and equations (1)–(3).

In step 408, the singular geometry of the TOA measurement set is tested. This is done through use of a matrix M, given as:

$$M = \begin{vmatrix} (x_3 - x_1) & (y_3 - y_1) \\ (x_2 - x_1) & (y_2 - y_1) \end{vmatrix}$$

The determinant of the matrix M above (which must be nonzero to solve the equations) is proportional to the area enclosed by the three MS positions.

More generally, any near singularity condition that occurs when inverting the two-dimensional matrix M is an indication that the measurement set is not sufficient to determine the position of the BS, however coarsely. If the singularity of the received TOA measurements is inadequate, the method may acquire more TOA measurements.

In step 410, the TOA measurements and the GPS receiver position measurements are use to compute the (unknown) BS location coordinates x, y. Note that a significant geometry change must be induced by the motion of the MS before the equations can be solved. For example, if the MS was stationary, the two resulting linear equations in x and y would be linearly dependent and so could not be solved.

Since computation of the BS coordinates is more difficult than the computation of the perceived time bias offset b' and involves nonlinear processing, it is addressed first. It should be understood that alternately the perceived time bias offset b' could be derived first and the BS location could then be derived knowing the perceived time bias offset.

Determination of an initial solution may be performed as follows. Equation (1) may be subtracted from both equations (2) and (3), producing the TOA differences:

$$TOA_{21}=TOA_2-TOA_1=\sqrt{[(x-x_2)^2+(y-y_2)^2]}-\sqrt{[(x-x_1)^2+(y-y_1)^2]} \quad (4)$$

$$TOA_{31}=TOA_3-TOA_1=\sqrt{[(x-x_3)^2+(y-y_3)^2]}-\sqrt{[(x-x_1)^2+(y-y_1)^2]} \quad (5)$$

where the perceived time bias offset b' drops out due to the subtraction. Now, the distance variable $d_1$ from the MS to the BS at time 1 (see FIG. 2) may be defined as:

$$d_1=\sqrt{[(x-x_1)^2+(y-y_1)^2]} \quad (6)$$

The $-\sqrt{[(x-x_1)^2+(y-y_1)^2]}$ terms at the right of equations (4) and (5) are equal to $-d_1$ by definition. Therefore, by adding $+d_1$ to both sides of equations (4) and (5), they may be rewritten as:

$$TOA_{31}+d_1=\sqrt{[(x-x_3)^2+(y-y_3)^2]} \quad (7)$$

$$TOA_{21}+d_1=\sqrt{[(x-x_2)^2+(y-y_2)^2]} \quad (8)$$

Squaring equations (7) and (8) results in:

$$TOA_{31}^2+2d_1TOA_{31}+d_1^2=(x-x_3)^2+(y-y_3)^2 \quad (9)$$

$$TOA_{21}^2+2d_1TOA_{21}+d_1^2=(x-X_2)^2+(y-y_2)^2 \quad (10)$$

Subtracting the term $d_1^2$ from both sides of equations (9) and (10) gives the desired results:

$$TOA_{31}^2+2d_1TOA_{31}=-2(x_3-x_1)x-2(y_3-y_1)y+k_3-k_1 \quad (11)$$

$$TOA_{21}^2+2d_1TOA_{21}=-2(x_2-x_1)x-2(y_2-y_1)y+k_2-k_1 \quad (12)$$

where $$k_1=x_1^2+y_1^2$$

$$k_2=x_2^2+y_2^2$$

$$k_3=x_3^2+y_3^2$$

Equations (11) and (12) represent two linear equations, which can be solved for x and y in terms of the unknown distance variable $d_1$ (the distance from the MS to the BS at time t=1), provided that the matrix M given previously is invertable. If the matrix M cannot be inverted, additional MS positions and TOA measurements must be collected before the location can be accurately determined. Given x and y in terms of the distance variable $d_1$ (i.e., equation (6)), the distance variable $d_1$ can be substituted for the term $\sqrt{[(x-x_1)^2+(y-y_1)^2]}$ to form a quadratic equation in terms of the distance variable $d_1$.

In a first method for obtaining a final solution, the quadratic equation for the distance variable $d_1$ is solved directly, producing two possible results for the distance variable $d_1$. This quadratic solution ambiguity can be resolved by discarding a solution that is out of the region of interest. The region of interest may be a position fix determined by the mobile GPS receiver, or may be an indication of the serving cell location. In a second method for determining a final solution, the quadratic equation for the distance variable $d_1$ is solved by processing an additional TOA measurement, i.e., a fourth TOA measurement $TOA_4$ and a third difference $TOA_4-TOA$. The fourth TOA measurement $TOA_4$ leads to a third linear equation, similar in form to equations (11) and (12). This permits a direct, unambiguous solution for x, y and $d_1$ (i.e., no approximate position knowledge is required). Either final solution method produces an estimated range $d_e$ to the BS, which may be substituted into equation (6) to compute the BS coordinates x, y.

In step 414, the perceived time bias offset b' is determined by subtracting the estimated range $d_e$ (i.e., the calculated distance determined above) from any of the TOA equations $TOA_i$. In step 416, the computed BS location and the perceived time bias offset b' are optimized in order to improve their accuracy and usefulness.

The nonlinear solution for the BS coordinates x, y provides a starting point for calibrating the BS location in the MS. The calculated BS location, however, is capable of being improved. The calibration may be fine-tuned by linearizing the TOA equations (1)–(3) and then computing a Weighted Least Squares (WLS) solution. The WLS solution will, in general, improve the accuracy of the calibration of the BS location and will enable a reasonable assessment of the accuracy of the calibration. This assessment can be used to determine when the BS location calibration is complete (i.e., satisfactorily accurate).

The TOA measurements ($TOA_1$, $TOA_2$, $TOA_3$) are linearized about the initial, nonlinear, solution by subtracting an estimated TOA (computed from the initial BS location with b' set to zero) from each measured TOA. Once linearized about the initial solution, the TOA measurement set ($TOA_1$, $TOA_2$, etc.) can be collected together as a vector of measurement residuals, $TOA_{res}$, defined as:

$$TOA_{res}=H\,x_{sol} \quad (13)$$

where H is a measurement gradient vector and $x_{sol}$ is a three dimensional solution vector. Each row of H has the following general form:

$$h_i^T=[u_x\ u_y\ 1]$$

where $u_x$ and $u_y$ are the components of a Line Of Sight (LOS) unit vector to the BS (computed using its initial estimated location).

The WLS $x_{sol}$ solution is given by:

$$x_{sol}=(H^TR^{-1}H)^{-1}H^TR^{-1}TOA_{res} \quad (14)$$

where R is a measurement error covariance matrix corresponding to a TOA measurement set. Note that the R matrix must include the effects of the error in the GPS solution itself, projected along the estimated LOS unit vector to the BS.

A by-product of the WLS solution $x_{sol}$ is the solution error covariance matrix $(H^TR^{-1}H)^{-1}$, which can and should be used to predict the accuracy of the calculated BS location and the perceived time bias offset b'.

As previously mentioned, the calibration is complete when the solution error variances become acceptably small, and the error variances are confirmed by the residuals of an over-determined solution. A proposed acceptable solution error variance threshold is one meter, one sigma, which is negligible relative to the positioning requirements (roughly fifty meters, one sigma, as specified in a U.S. Federal Communication Commission (FCC) edict on emergency positioning). As this requirement is relaxed, the required calibration accuracy can be relaxed proportionately.

Upon completion of the BS location calibration, subsequent TOA measurements can be combined with GPS pseudorange measurement data to improve the location accuracy of the MS for calibrating other BS locations.

If the BS location is already known to the GPS receiver, but the perceived time bias offset b' is not, the problem is already in linear form and the solution is straightforward. The TOA residual vector is directly related to the time offset bias as:

$$TOA_{res} = H\, b_e \tag{15}$$

Each row of H is unity and the perceived time bias offset $b_e$ collapses to a weighted average of the measurement residuals. The accuracy of the perceived time bias offset $b_e$ can be determined from the solution error covariance matrix $(H^T R^{-1} H)^{-1}$.

Figure 5:
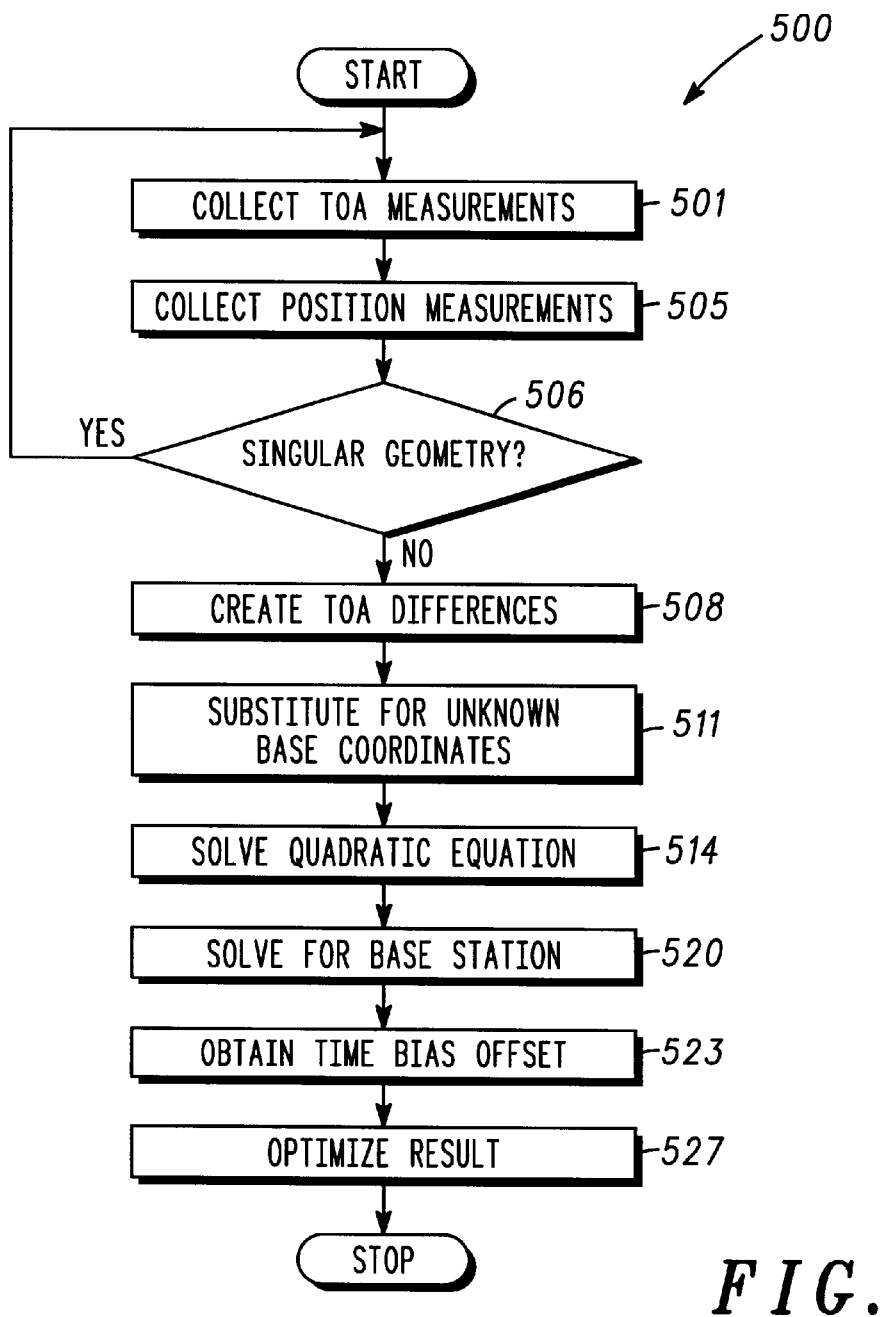
FIG. 5 shows a flowchart of a second embodiment of a method for calibrating base station locations and time bias offsets.

FIG. 5 shows a flowchart 500 of a second embodiment of a method for calibrating BS locations and perceved time bias offsets. In step 501, an MS collects TOA measurements from a BS in a manner similar to the first flowchart 400, producing equations (1)–(3). In step 505, a corresponding number of GPS receiver position measurements are generated by the GPS receiver.

In step 506, the singular geometry of the TOA measurement set is again tested using the matrix M. As before, if the singularity of the received TOA measurements is inadequate, the method may acquire more TOA measurements and wait until the singularity reaches a certain threshold.

In step 508, the TOA measurements are used to create TOA difference equations (4) and (5). In step 511, the difference equations have the distance variable $d_1$ added to both side of the equation, the equations are squared, and the term $d_1^2$ is subtracted from both sides to yield equations (11) and (12). In step 514, the distance variable $d_1$ is substituted for the value $\sqrt{[(x-x_1)^2+(y-y_1)^2]}$ to produce a quadratic equation in terms of the distance variable $d_1$.

In step 520, the distance variable $d_1$ is solved. In a first final solution method, the quadratic equation for the distance variable $d_1$ is solved directly, producing two possible results for the distance variable $d_1$. This quadratic solution ambiguity can be resolved by discarding a solution which is out of the region of interest. The region of interest may be a position fix determined by the mobile GPS receiver, or may be a set of previously acquired BS coordinates.

In a second final solution method, the quadratic equation for the distance variable $d_1$ is solved by processing a fourth TOA measurement $TOA_4$ and a third difference $TOA_4-TOA_1$. The third difference $TOA_4-TOA_1$ leads to a third linear equation, similar in form to equations (11) and (12). This permits a direct, unambiguous solution for x, y and $d_1$ (i.e., no approximate position knowledge is required).

In step 523, the computed BS coordinates x, y may be used to compute the perceived time bias offset b'. The perceived time bias offset b' may be determined by subtracting the estimated range $d_e$ from any of the TOA equations $TOA_i$. In step 527, the computed BS location and the perceived time bias offset b' are optimized in the same manner as in the first flowchart 400.

Once the BS calibration is essentially complete, the perceived time bias offset b' is periodically re-determined and associated with each MS location or BS service area. Over time, this association permits construction of a temporal map, or database, of perceived time bias offsets versus MS position over the area served by a BS. The perceived time bias offset may represent the time bias offset b as affected by spatial error from multipath in addition to the fixed error induced by cable delays, internal BS harnessing, software processing, clock source distribution, and other factors. This map can be derived and maintained for many BSs by the cellular infrastructure and broadcast to other MSs (GPS of non-GPS equipped) to improve their location accuracy. Various other information can be appended to this map, such as a confidence factor based on a solution error variance, a time stamp based on ephemeris data, or the time bias offset b, for any perceived time bias offset b'. Also the map may be compressed by reducing it merely to a correction factor of b.

The perceived time bias offset may be stored in MSs and subsequent offset measurements loaded periodically to a recording device in the infrastructure capable of creating the map. Alternatively, a simultaneous transaction session, such as a short message service (SMS), Bluetooth, or a defined protocol, could act to transfer the perceived time bias offsets over the air back to the infrastructure or another MS, which may or may not be GPS assisted. The described perceived time bias offset calculation may be realized as a standard mode of operation requested by the infrastructure thereby allowing a population of MSs to participate in realizing the perceived time bias offset map.

The perceived time bias offset map can be used in a variety of applications to aid in more accurate location of an MS, whether or not GPS-equipped. For example, typical multipath reduction techniques attempt to remove a calculated time bias offset based on a statistical measure of the variance of a signal over time. When line-of-sight (LOS) conditions exist (i.e., there is little multipath), multipath reduction techniques end up compensating for a non-existent problem, and this "compensation" in effect adds error to the TOA estimate. To intelligently aid the effectiveness of such multipath reduction techniques, the realized map of perceived time bias offset versus position over the area served by each BS may be queried. The returned perceived time bias offset can be used as a discriminator to determine when to use a multipath reduction technique.

Accessing precise perceived time bias offset map information could be obtained once a first GPS-based position is obtained. This precise value acts as a multipath reduction technique discriminator for BS TOA signals used in conjunction for subsequent hybrid GPS and cellular terrestrial position fixes. Alternatively, after a first terrestrial-only (enhanced observed time difference (EOTD) or advanced forward-link trilateration (AFLT)) location fix is obtained via blindly applying a multipath rejection technique, the perceived time bias offset map values corresponding to the sum of the delays for each BS could be used in subsequent fixes as a location-specific reduction value for terrestrial-only fixes. This application assumes an MS to also contain terrestrial location technology. The effect is to hone the terrestrial measurements over time.

Approximate perceived time bias offset information could be statistically generated for a cell or sector's service area.

In rural cells, typical scenarios may incur low amounts of multipath, in contrast to dense urban environments. This method allows the MS to decide if multipath rejection techniques should be executed. The lifetime of the specific perceived time bias offset value should ideally be re-evaluated upon each GPS position calculation opportunity that results in a BS calibration operation. GPS time, such as that found in ephemeris data, can be used to evaluate the "staleness" of the perceived time bias offset value.

Figure 6:
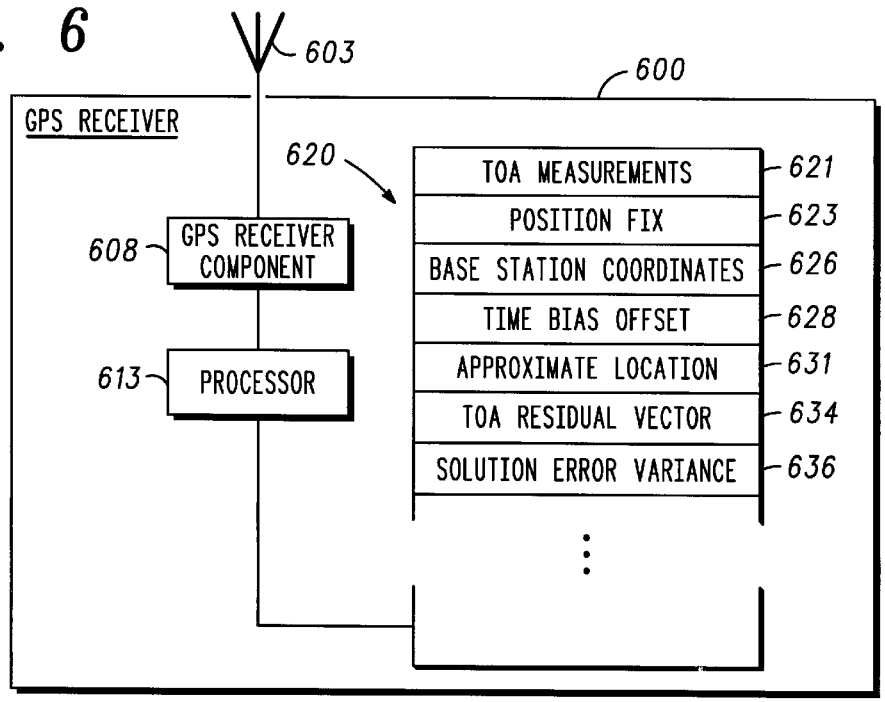
FIG. 6 shows a GPS receiver that can be used for calibrating base station locations and time bias offsets.

FIG. 6 shows a GPS receiver 600 that can be used for calibrating BS locations and perceived time bias offsets. The GPS receiver 600 includes an antenna 603, a GPS receiver component 608, a processor 613, and storage 620. The processor 613 may be any type of general purpose processor available in the art.

The storage 620 may be any type of storage memory, including random access memory (RAM), magnetic disk or tape, optical memory, etc. The storage 620 includes a TOA measurement storage 621 capable of storing a plurality of TOA measurements, a position fix storage 623 capable of storing a plurality of position fixes of the GPS receiver 600, a BS coordinates storage 626 capable of storing a calculated BS location and/or a BS location received from the infrastructure, a time bias offset storage 628 capable of storing a calculated perceived time bias offset b' and/or a time bias offset b received from the infrastructure, an approximate location storage 631 capable of storing an approximate geographical location of the BS, a TOA residual vector storage 634 capable of storing a TOA residual vector formed from the TOA measurements, and a solution error variance storage 636 capable of storing a solution error variance threshold.

It should be noted that although the individual components are shown as being dedicated components, alternatively the components may be shared with other hardware and functions. For example, when the GPS receiver 600 is combined with a cellular handset in an MS, the processor 613 and the storage 620 may be shared between the cellular phone functionality and the GPS receiver functionality.

In use, a GPS signal is received through the antenna 603 and decoded by the GPS receiver component 608. The GPS receiver component 608 sends the decoded GPS data to the processor 613, which may store some or all of the received GPS data in the storage 620.

The processor 613 is capable of collecting and storing TOA measurements, collecting and storing a corresponding number of GPS position measurements, subtracting a first TOA measurement from subsequent TOA measurements to create TOA differences, substituting a distance variable $d_1$ for the unknown BS coordinates x, y in the TOA differences to produce a quadratic equation, solving the quadratic equation for the distance variable $d_1$ to obtain an estimated range $d_e$, solving for the unknown BS coordinates x, y, obtaining the perceived time bias offset b' by subtracting the estimated range $d_e$ from the TOA measurements, linearizing TOA equations to produce linearized TOA equations, generating a vector of measurement residuals $TOA_{res}$, computing a weighted least squares solution $x_{sol}$ of the TOA equations, using the weighted least squares solution $x_{sol}$ to assess an accuracy of the linearized TOA equations, and stopping the linearizing when solution error variances of the weighted least squares solution $x_{sol}$ become less than a solution error variance threshold. This solution error variance threshold can either be predetermined or calculated and modified dynamically.

In this manner, the GPS receiver 600 may operate autonomously and does not need to be dependent on reception of a BS location and time bias offset b. The BS location and perceived time bias offset b' derived by the GPS receiver 600 may be used in conjunction with TOA measurements to accurately calculate a position fix of the GPS receiver 600.

While the invention has been described in detail above, the invention is not intended to be limited to the specific embodiments as described. For example, satellite positioning systems such as GLONASS can be substituted for the GPS satellite positioning system. It is evident that those skilled in the art may now make numerous uses and modifications of and departures from the specific embodiments described herein without departing from the inventive concepts.

What is claimed is:

1. A method for calibrating a base station location using a satellite positioning receiver in a mobile station, comprising the steps of:

collecting a number of time-of-arrival (TOA) measurements arriving at the mobile station from a base station;

simultaneously collecting a corresponding number of satellite position measurements of the satellite positioning receiver;

determining that the number of TOA measurements and the corresponding number of satellite position measurements is sufficient for calibrating the base station location; and computing the base station location using the number of TOA measurements and the corresponding number of satellite position measurements.

2. The method of claim 1, further comprising the step of:

computing a perceived time bias offset b' using the number of TOA measurements and the corresponding number of satellite position measurements.

3. The method of claim 2, further comprising the steps of:

associating the perceived time bias offset b' with a satellite positioning receiver position; and creating at least a portion of a map of perceived time bias offset as a function of satellite positioning receiver position.

4. The method of claim 3, further comprising the step of:

transmitting the map to another mobile station.

5. The method of claim 3, wherein the step of creating comprised:

updating the map within a cellular infrastructure.

6. The method of claim 5, further comprising the step of:

using the perceived time bias offset in the map to determine whether to use a multipath reduction technique.

7. The method of claim 6, further comprising the step of:

using the perceived time bias offset in the map to compute a position of the mobile station.

8. The method of claim 1, wherein the step of computing comprises the steps of:

subtracting a first TOA measurement from subsequent TOA measurements to create two TOA differences $TOA_{31}$, $TOA_{21}$;

substituting a distance variable $d_1$ for base station coordinates x, y in the two TOA differences $TOA_{31}$, $TOA_{21}$ to produce a quadratic equation for the distance variable $d_1$, where the distance variable $d_1 = \sqrt{[(x-x_t)^2+(y-y_t)^2]}$;

solving the quadratic equation for the distance variable $d_1$ to obtain an estimated range $d_e$; and solving for the base station coordinates x, y using the estimated range $d_e$.

9. The method of claim 8, further comprising the step of:

computing a perceived time bias offset b' using the number of TOA measurements and the corresponding number of satellite position measurements.

10. The method of claim 9, wherein the step of computing a perceived time bias offset b' comprises:

subtracting the estimated range $d_e$ from a TOA measurement.

11. A method for calibrating a base station location in a mobile station having a satellite positioning receiver, comprising the steps of:

collecting at least three TOA measurements $TOA_1$, $TOA_2$, $TOA_3$ arriving at the mobile station from a base station at different times t, wherein a TOA measurement is capable of being expressed as $TOA_t = b' + \sqrt{[(x-x_t)^2 + (y-y_t)^2]}$, with variable b' being a perceived time bias offset of the base station and (x, y) being base station coordinates;

simultaneously collecting at least three satellite position measurements of a position of the satellite positioning receiver, wherein a position measurement is denoted as $x_t$ and $y_t$ as a function of time;

determining through a geometry matrix that the at least three TOA measurements and the at least three satellite position measurements are sufficient for determining the base station location;

subtracting a first TOA measurement $TOA_1$ from at least two subsequent TOA measurements $TOA_2$, $TOA_3$ to create at least two TOA differences $TOA_{31}$, $TOA_{21}$;

substituting a distance variable $d_1$ for the base station coordinates x, y in the at least two TOA differences $TOA_{31}$, $TOA_{21}$ to produce a quadratic equation for the distance variable $d_1$, where the distance variable $d_1 = \sqrt{[(x-x_t)^2 + (y-y_t)^2]}$;

solving the quadratic equation for the distance variable $d_1$ to obtain an estimated range $d_e$;

solving for the base station coordinates x, y using the estimated range $d_e$; and obtaining the perceived time bias offset b' by subtracting the estimated range de from a TOA measurement.

12. The method of claim 11, wherein the step of solving the quadratic equation comprises the steps of:

solving the quadratic equation to produce two solutions; and discarding a solution that is out of a geographical region of interest to leave an accepted solution.

13. The method of claim 11, wherein the step of solving the quadratic equation comprises the steps of:

obtaining at least a fourth TOA measurement and at least a third TOA difference; and using the at least a third TOA difference in conjunction with the quad ratic equation to determine a solution for the distance variable $d_1$ and for the base station coordinates x, y.

14. The method of claim 11, further including the steps of:

linearizing the at least three TOA measurements $TOA_1$, $TOA_2$, $TOA_3$ by subtracting estimated ranges from them, with the estimated ranges determined from the base station coordinates x, y, to produce linearized TOA equations;

generating a vector of measurement residuals $TOA_{res}$;

computing a weighted least squares solution $x_{sol}$ of the linearized TOA equations;

correcting the base station coordinates x, y using the weighted least squares solution $x_{sol}$;

repeating the steps of generating, computing, and correcting until a magnitude of the weighted least squares solution $x_{sol}$ becomes less than a solution error variance threshold;

using a covariance matrix of the weighted least squares solution $x_{sol}$ to assess an accuracy of the base station coordinates x, y; and using the accuracy to determine that the base station location calibration is complete.

15. The method of claim 14, wherein the step of using the covariance matrix additionally makes use of measurement residual information from the weighted least squares solution $x_{sol}$.

16. The method of claim 14, wherein the step of using the accuracy additionally makes use of residual information from the weighted least squares solution $x_{sol}$.

17. The method of claim 14, wherein the vector of measurement residuals $TOA_{res}$ is given by $TOA_{res} = H \, x_{sol}$, where H is a measurement gradient vector and the weighted least squares solution $x_{sol}$ is a three dimensional weighted least squares solution vector, and where a row of the measurement gradient vector H has a form of $h_i^T = [u_x \, u_y \, 1]$ with $u_x$ and $u_y$ being components of a line of sight unit vector to the base station.

18. The method of claim 14, wherein the weighted least squares solution $x_{sol}$ is given as $x_{sol} = (H^T R^{-1} H)^{-1} H^T R^{-1} TOA_{res}$, where R is the covariance matrix.

19. The method of claim 14, wherein if the base station coordinates x, y are known but the perceived time bias offset b' is not known, then a TOA residual vector $TOA_{res}$ is given by $TOA_{res} = H \, b_e$, where each row of H is unity and an estimated time bias offset $b_e$ collapses to a weighted average of measurement residuals, and an accuracy of the estimated time bias offset $b_e$ can be determined from the covariance matrix.

20. An apparatus for calibrating a base station location in a mobile station, comprising:

a satellite positioning receiver;

a radio transceiver;

a time-of-arrival (TOA) measurement storage for storing a plurality of TOA measurements;

a satellite positioning receiver position fix storage for storing a plurality of position fixes;

a base station coordinates storage;

a time bias offset storage; and a processor, for communicating with the radio transceiver and satellite positioning receiver to receive signals from satellite positioning satellites and from a base station, and further communicating with the TOA measurement storage, the satellite positioning receiver position fix storage, the base station coordinates storage, and the time bias offset storage, with the processor capable of collecting and storing TOA measurements, collecting and storing a corresponding number of satellite position measurements, subtracting a first TOA measurement from subsequent TOA measurements to create TOA differences, substituting a distance variable $d_1$ for base station coordinates x, y in the TOA differences to produce a quadratic equation, solving the quadratic equation for the distance variable $d_1$ to obtain an estimated range $d_e$, solving for the base station coordinates x, y, obtaining a perceived time bias offset b' by subtracting an estimated range $d_e$ from the TOA measurements, linearizing the TOA measurements to produce linearized TOA equations, generating a vector of measurement residuals $TOA_{res}$, computing a weighted least squares solution $x_{sol}$ of the linearized TOA equations, using the weighted least squares solution $x_{sol}$ to assess an accuracy of the linearized TOA equations, and repeating the generating, computing, and using until a solution error variance of the weighted least squares solution $x_{sol}$ becomes less than a solution error variance threshold.

21. The apparatus of claim 20, further including an approximate geographical location storage, communicating with the processor, for storing an approximate geographical location for use in obtaining an estimated range $d_e$.

22. The apparatus of claim 20, further including a TOA residual vector storage, communicating with the processor, for holding the vector of measurement residuals $TOA_{res}$.

23. The apparatus of claim 20, further including a solution error variance threshold storage, communicating with the processor, for holding the solution error variance threshold.

* * * * *

UNITED STATES PATENT AND TRADEMARK OFFICE
CERTIFICATE OF CORRECTION

PATENT NO.   : 6,445,927 B1
DATED        : September 3, 2002
INVENTOR(S)  : Zhao et al.

It is certified that error appears in the above-identified patent and that said Letters Patent is hereby corrected as shown below:

Column 11,
Line 41, change "de" to -- $d_e$ --
Line 54, change "quad ratic" to -- quadratic --

Signed and Sealed this

Eleventh Day of February, 2003

JAMES E. ROGAN
*Director of the United States Patent and Trademark Office*